Dec. 17, 1963

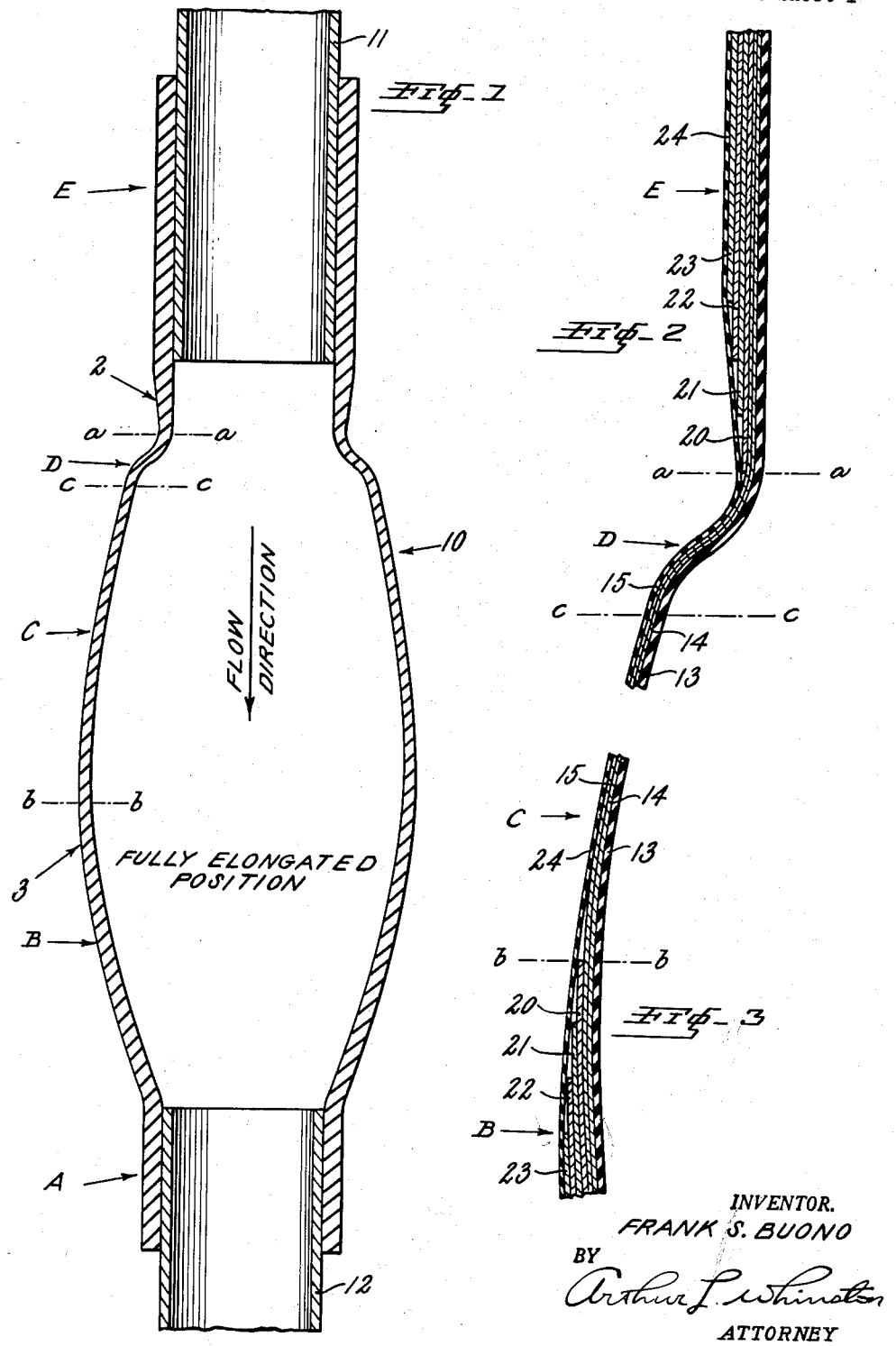

F. S. BUONO 3,114,568

TELESCOPING EXPANSION JOINT

Filed Dec. 28, 1960

INVENTOR.
FRANK S. BUONO
BY
Arthur L. Whinston
ATTORNEY

United States Patent Office 3,114,568
Patented Dec. 17, 1963

3,114,568
TELESCOPING EXPANSION JOINT
Frank S. Buono, Garfield, N.J., assignor to United States Rubber Company, New York, N.Y., a corporation of New Jersey
Filed Dec. 28, 1960, Ser. No. 79,034
1 Claim. (Cl. 285—235)

This invention relates to expansion joints and, more particularly, to expansion joints used to connect adjacent hollow conduits subject to substantial relative axial movement.

The usual expansion joint is designed to accommodate only a relatively slight axial deformation. Where the conduits to be joined, however, are subject to relatively large axial movement, existing type connections cannot provide the large axial deformation required.

Furthermore, where telescoping type connections have been used to join conduits carrying finely powdered materials, the folds in the joints trapped the material, making the transfer generally unsatisfactory.

Accordingly, it was an object of the present invention to provide a flexible expansion joint that could accommodate relatively large axial formations. It was a further object of the present invention to provide such a joint of the telescoping type, wherein the internal folds would not serve as places in which to entrap materials flowing from one joined conduit to another.

In accordance with these objects I have invented a flexible connection for joining adjacent hollow conduits subject to relatively large axial movement comprising a unitary tubular body made of impervious flexible rubber-like material. The body of my connection includes axially-spaced hollow connecting portions which are connectable to the hollow conduits designed to be joined. Also included is a tubular intermediate portion of bulbous configuration, one end of this bulbous intermediate portion being constructed of material relatively more flexible than the other. Thus, the axially inner end of the connecting portion adjacent the relatively more flexible end of the intermediate portion can telescope into the other end of the bulbous intermediate portion, thereby to achieve relatively large axial deflections in the connection.

Other features and details of construction will become apparent from the following description and accompanying drawings, in which:

FIG. 1 is a longitudinal cross-sectional view of my connection in the fully elongated position;

FIG. 2 is an enlarged cross-sectional view of the wall construction of my connection in the vicinity of 2 in FIG. 1;

FIG. 3 is an enlarged cross-sectional view of the wall construction of my connection in the vicinity of 3 in FIG. 1.

Figure 4:
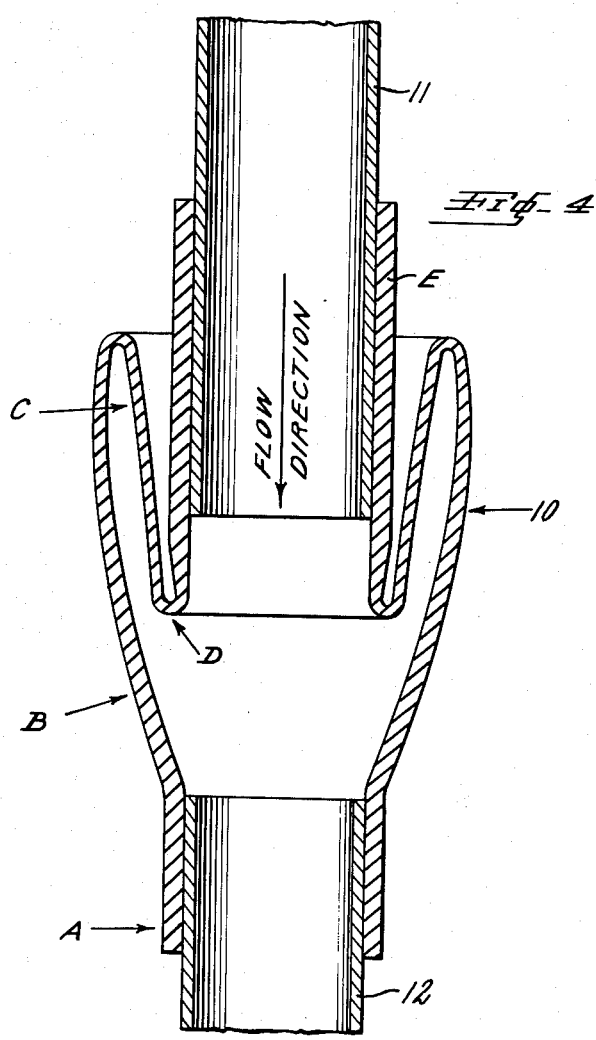
FIG. 4 is a longitudinal cross-sectional view of my connection in the fully deflected position.

Referring to FIG. 1, there is disclosed a flexible connection 10 for joining adjacent hollow conduits 11 and 12, which are subject to relatively large axial movement.

The connection 10 essentially consists of five sections, which I have designated by the letters A to E, inclusive. Sections A and E are the sleeves or connecting portions which fit over the conduits 11 and 12. Sections B, C and D are the working sections of the connection. Section B is the receiving section, section C is the flexible section and section D is the deflection starting section. (See FIGS. 1 and 4.)

The connection is reinforced with a number of plies of fabric of varying flexibility. This permits the connection to function in the manner described. In order to illustrate how these reinforcing plies contribute to the effective functioning of the action, a 48 inch long connection will be described in detail, although it must be realized that other sizes of connections can be fabricated and will, in general, have different types of reinforcing.

In the 48 inch long connection chosen to illustrate my invention, the innermost ply is preferably formed of a sheet of 0.062 inch thick rubber 13 laid up on a form of the desired shape. (See FIGS. 2 and 3.) Two plies 14 and 15 of 4½ ounce open weave cotton fabric are then laminated on, with the warp and fill fibers directed diagonally (or on a bias) with respect to the longitudinal axis of the connection. Plies 14 and 15 preferably are coated on both sides with a thin sheet of rubber to increase their flexibility.

In addition to plies 14 and 15, sections A, B and E are reinforced with four additional plies 20, 21, 22 and 23 of frictioned 20 ounce tightly-woven cotton duck fabric, as shown in FIGS. 2 and 3. These heavier plies 20, 21, 22 and 23 are used to give sections A, B and E the desired rigidity.

In the 48 inch long connection used as an example, section A is preferably made 6 inches long. Section B (extending from the inner end of section A to line b—b in FIG. 1) is preferably made 12 inches long. Section C (extending from line b—b to line c—c in FIG. 1) is preferably made 14 inches long. Section D (extending from line c—c to line a—a in FIG. 1) is preferably made 1¼ inches long. Finally, section E (extending outwardly from line a—a) is preferably made 14¾ inches long.

Starting at lines a—a and b—b, plies 20, 21, 22 and 23 are stepped back outwardly in ½ inch increments to yield at these sections a gradual transition in rigidity. Thus, sections C and D, the flexible sections, are reinforced only with plies 14 and 15. This is clearly brought out in FIGS. 2 and 3. Stepping the plies back in this way reduces the possibility of stress concentrations at the junctions of the rigid and flexible sections.

A rubber layer 24 covers the entire connection, as shown in FIGS. 2 and 3. Rubber cover layer 24, in the example chosen, is preferably made from 0.032 inch thick material.

The intermediate or working portion of the connection 10 consists of sections B, C and D, as previously mentioned, and is of a generally bulbous configuration. That is, its diameter is equal to that of the connecting portions, sections A and E, at its axially outer ends, but the diameter gradually increases to a maximum in the region of the center. Section B, the receiving section, is of course much stiffer than sections C and D, inasmuch as it is reinforced with the additional plies 20, 21, 22 and 23 of 20 ounce cotton duck material. Additionally, section B is designed to have a diameter variation such that material going through the connection will gravitate towards section A and also such that section C can telescope into section B without interference. (See FIG. 4.)

Section C of the connection, the larger part of the relatively more flexible end of the intermediate portion of the connection, is reinforced with only the two plies 14 and 15 of the lightweight open weave cotton fabric. The diagonal (or bias) direction of the fibers in these plies improves the flexibility of this section. Additionally, section C is designed to have a diameter variation such that it may accomplish the necessary telescopic compression without rubbing contact with section B, which would cause premature wear. Eliminating this rubbing contact during the flexing of the connection also reduces the load required to cause deflection.

Section D is the deflection starting section and is also reinforced with only the two plies 14 and 15 of the lightweight open weave cotton fabric. Section D commences at the outer end of section C and constitutes the balance of the relatively more flexible end of the intermediate portion of the connection. Section D extends, in the 48 inch long connection, a distance of 1¼ inches, as previously mentioned. (It should be noted that the plies 20, 21, 22 and 23 of heavyweight cotton duck fabric are not introduced incrementally until the beginning of section E, as clearly shown in FIG. 2.) Section D is designed to have a severe diameter variation, as shown in FIG. 2. This rapid decrease in diameter facilitates the initiation of telescopic deflection in the connection. Without this severe reduction in diameter, it would be difficult, if not impossible, to start telescopic deflection as required.

My connection is preferably fabricated on a steel pole on which is mounted a sectionalized rubber core to give the desired shape to sections B, C and D. Rubber layer 13 is first lapped on the form, followed by the application of reinforcing plies 14, 15, 20, 21, 22 and 23, in that order. The rubber cover layer 24 is applied last.

The completely laminated connection is then wrapped with nylon tape under tension to give the required pressure during vulcanization. After vulcanization, the wrapping is stripped off the joint. The steel pole is then withdrawn and the rubber core is removed in sections. The connection will then be ready for use.

In operation, the connection 10 is preferably used in the transfer of comminuted solids or liquids from a flexible container (terminating in conduit 11) to a receiving pipe (indicated as conduit 12). Thus, the flow direction is as indicated by the arrows in FIGS. 1 and 4.

In practice the amount of deflection required for a specific installation is generally known, and the connection is designed to provide this together with an additional amount of deflection, known as "starting compression." This is necessary because the connection must be attached to the respective conduits with compression already initiated.

Compression is initiated by holding the connection approximately one foot above a solid, level surface (such as a floor or the ground) with the relatively more flexible end of the intermediate portion (that is, with section E) down. The connection is then struck a solid blow against the surface, initiating the telescoping action.

The connection is then fully compressed by hand and appears as illustrated in FIG. 4. In general, it will now be shorter in total length than the distance between the conduits to be joined. It is placed between conduits 11 and 12 and clamped or otherwise attached to conduit 12, the inlet pipe. Section E is then pulled, by hand, up and out of section B and clamped or otherwise attached to conduit 11, the outlet pipe, leaving the connection partially compressed. This initial partial compression is the "starting compression," which was mentioned above.

The connection is now ready to accomplish the required installation deflection, for which it was designed. As conduit 11 moves substantially toward conduit 12, section C of the connection, being relatively more flexible than section B, will telescope into section B, as shown in FIG. 4. This telescoping action occurs without any rubbing contact, as has been previously described.

In some cases an installation will be made where the connection is installed fully compressed. The motion of the conduits is away from each other, hence the required installation deflection will be all extension. In this situation, the amount of extension is limited only by the total length of the connection.

Since the transfer of material is always from conduit 11 to conduit 12, as shown by the arrows in FIGS. 1 and 4, there are no internal folds in the connection to serve as places in which to entrap materials. Also, as will be apparent from the description and the drawings, the connection accommodates a relatively large axial movement between conduits 11 and 12. It is possible, for example, to compress a connection 48 inches long a total of 24 inches, if the connection is fabricated as described herein.

Having thus described my invention, what I claim and desire to protect by Letters Patent is:

A flexible connection for joining adjacent hollow conduits subject to substantial relative axial movement, comprising a unitary tubular body formed of impervious flexible rubber-like material and a plurality of plies of reinforcing fabric embedded in and united with said rubber-like material; said tubular body comprising axially-spaced hollow connecting portions connectable to the hollow conduits, and a tubular intermediate portion joining said connecting portions and having a diameter equal to that of said connecting portions at its axially outer ends, but gradually increasing to a maximum in the region of its center; one end of said intermediate portion being reinforced with two plies of lightweight open weave bias cut fabric, the remainder of said connection being reinforced with at least four plies of frictioned tightly-woven fabric stepped back in increments to form a gradual transition from the lightly reinforced end, whereby said lightly reinforced end can telescope into the other end of said intermediate portion, thereby to achieve relatively large axial deflections of said connection.

References Cited in the file of this patent
UNITED STATES PATENTS

| | | |
|---|---|---|
| 2,451,438 | Hartman | Oct. 12, 1948 |
| 2,687,015 | Edwards | Aug. 24, 1954 |
| 2,693,223 | Krupp | Nov. 2, 1954 |